April 4, 1961 C. B. TEDFORD 2,978,645
ELECTRONIC SWITCHING CIRCUIT
Filed July 10, 1953
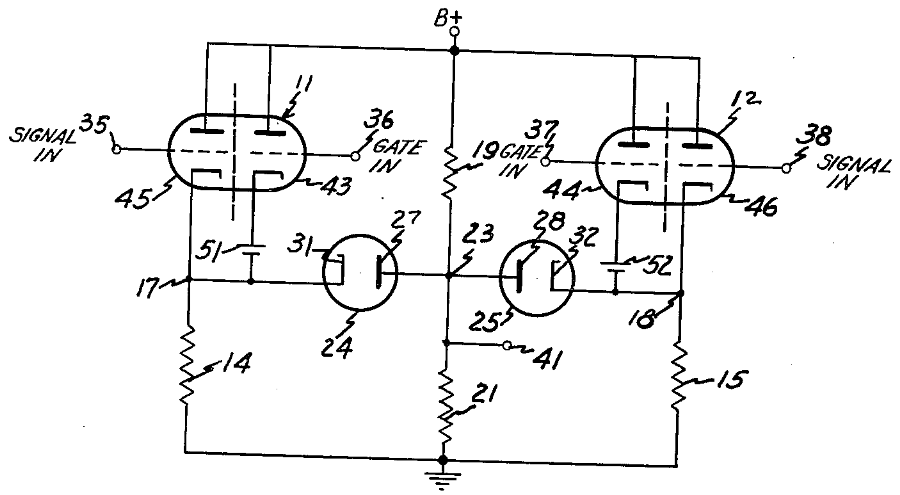
INVENTOR.
CHARLES B. TEDFORD
BY George Lipkin
Lee J. Huntzberger
ATTORNEYS

United States Patent Office 2,978,645

Patented Apr. 4, 1961

2,978,645

ELECTRONIC SWITCHING CIRCUIT

Charles B. Tedford, Syracuse, N.Y., assignor, by mesne assignments, to the United States of America as represented by the Secretary of the Navy Filed July 10, 1953, Ser. No. 367,146

2 Claims. (Cl. 328—101)

This invention concerns an electronic switching circuit and more particularly it concerns an electronic switching circuit including a plurality of input terminals and only a single output terminal for use with a plurality of signal sources for mixing time-displaced signals therefrom and for selectively blocking signals originating at one or more of the signal sources.

An object of this invention is to provide an electronic switching circuit adapted to mix separate time-displaced input signals originating at a plurality of sources to provide a single output.

A further object is to provide an electronic switching circuit adapted to selectively discriminate between a plurality of simultaneous input signals from respective signal sources whereby only the larger of the input signals will appear at the output of the circuit.

A further object is to provide an electronic switching circuit adapted to mix a plurality of time-displaced input signals with substantially reduced noise level over the results of conventional additive mixing.

A further object is to provide an electronic switching circuit adapted to accommodate a plurality of inputs and further adapted to selectively permit any one of said inputs to appear at the output thereof, or any combination of said inputs to appear at the output thereof, or no output at all.

Other objects and many of the attendant advantages of this invention will be readily appreciated as the same becomes better understood by reference to the following detailed description when considered in connection with the accompanying drawings wherein:

The single figure is a schematic diagram of an embodiment of this invention.

There is shown on the drawing a pair of twin triode vacuum tubes 11 and 12. The plates of the pairs of twin triodes are connected to the same B+ supply. The pairs of cathodes of twin triodes 11 and 12, respectively, are connected to ground as a source of reference potential through cathode resistors 14 and 15, respectively, whereby the triodes are connected as cathode followers having terminals 17 and 18. A pair of resistors 19 and 21 are serially connected between the same B+ supply and ground. The resistor 19 has an order of magnitude that is several hundred times as large as the resistor 21. Connected between each of the cathode follower terminals 17 and 18 and the junction 23 of the resistors 19 and 21 is a pair of rectifiers 24 and 25 herein shown as diodes. The plates 27 and 28 of each of said diodes is connected to the junction 23. The cathodes 31 and 32 of each of said diodes 24 and 25 is connected to the cathode follower terminals 17 and 18, respectively.

The input terminals of the switching circuit are indicated at 35, 36, 37, and 38 and are connected to the grids of the respective twin triodes 11 and 12. The single output terminal of the switching circuit is at 41 and has the same potential as junction 23.

When the grid to cathode potential of any one of the triode sections of the twin triodes 11 and 12 is zero, substantial current flows through that triode section raising the respective one of the cathode follower terminals 17 and 18 to a considerable potential above ground; both terminals 17 and 18 are raised above ground concurrently when a triode section of each of the twin triodes conducts concurrently. The quiescent voltage at junction 23 is substantially the same as ground potential since the voltage divider comprising resistors 19 and 21 is such that only a small fraction of the B+ supply is available at the junction 23. The rectifier 24 is cut off when terminal 17 is raised above the potential of junction 23 and the rectifier 25 is cut off when the terminal 18 is raised above the potential of junction 23. When both rectifiers are cut off the potential at output terminal 41 is that fraction of B+ determined by the ratio of the magnitudes of resistances 21 and 19.

The right-hand section 43 of twin triode 11 and the left-hand section 44 of twin triode 12 are utilized as gating components whereas the left-hand section 45 of twin triode 11 and the right-hand section 46 of twin triode 12 are utilized as signal components and are adapted to receive signal inputs. When the grid to cathode potential of each of the gating components 43 and 44 is zero, the rectifiers 24 and 25 are cut off precluding any output signal at terminal 41 regardless of any signals that are applied to the input terminals 35 and 38 of triode sections 45 and 46, respectively.

The gating sections 43 and 44 are biased beyond cutoff by batteries 51 and 52. The potentials of the cathode follower terminals 17 and 18 are lower when the gating sections 43 and 44 respectively are cut off than when they are conducting. Current that flows through the diode 24 or diode 25 also flows through the resistor 19 reducing the potential at output terminal 41 to less than the quiescent potential thereof.

In operation, the gating sections 43 and 44 normally are cut off, the signal sections 45 and 46 are conducting, and diodes 24 and 25 are nonconductive, and the potential at output terminal 41 is determined solely by the ratio of the resistance 21 to resistances 19 plus 21. When a negative signal input appears at either the terminal 35 or the terminal 38, a corresponding output signal appears at the output terminal 41. When there are separate negative signal inputs to both input terminals 35 and 38 and the signals to the respective input terminals are displaced in time, time-displaced output signals corresponding to the time-displaced input signals appear at terminal 41. However, if two signal inputs appear at the terminals 35 and 38 simultaneously the weaker of the two simultaneous input signals is blocked from output terminal 41 and a signal corresponding to the stronger of the simultaneous input signals only will appear at the output terminal 41. This is due to the fact that the stronger input signal (assuming it to be at terminal 35) will cause more current to flow through the associated diode (24) lowering the potential of junction 23 below that of the cathode (32) of the other diode (25). As a result the other diode (25) is cut off and the signal input at the other terminal (38) does not appear at the output terminal 41. This feature permits the mixing of two input signals with substantially reduced noise level over the results of conventional additive mixing.

A positive gating signal input at terminal 36 raises the potential at 17 so that even with a negative signal input at 35 the terminal 17 is more positive than the junction 23 and the diode 24 does not conduct. As a result, no output signal corresponding to the input signal at terminal 35 appears at the output terminal 41. Correspondingly the same can be done with the gating section 44 either simultaneously or alternately. When a positive gate input to either of the triode sections 43 and 44 is terminated the respective gating section is again cut off and the voltage at the respective terminals 17 and/or 18 returns to the potential level before gating action of sections 43 and/or 44 with no negative overshoot which could be coupled to the output terminal 41.

Through the use of separate gating tube sections 43 and 44 high flexibility in operation is achieved. Either of the signal input sections 45 and 46 may be selectively switched off so that a signal input thereto does not produce a corresponding signal at the output terminal 41. By this arrangement either one of respective signal inputs to the two terminals 35 and 38 may be prevented from producing corresponding output signals at output terminal 41 or respective signal inputs to both terminals 35 and 38 may be permitted to produce corresponding output signals at output terminal 41 subject to the limitation on simultaneous signals, above described, or respective signal inputs to both terminals 35 and 38 may be prevented from producing corresponding output signals at output terminal 41. Comparative freedom from the usual spikes, gates, and other switching transients in the output is achieved. By means of this arrangement signals of reasonable amplitude may readily be handled with good linearity and close to unity gain. If used in video applications, the low impedance that is possible permits very good video bandwidth. Low impedances involved in the circuit make it well suited to the use of germanium diodes. The low interelectrode capacities of these diodes make them particularly valuable for this application.

Obviously many modifications and variations of the present invention are possible in the light of the above teachings. It is therefore to be understood that within the scope of the appended claims the invention may be practiced otherwise than as specifically described.

I claim:

1. An electronic switching circuit for use with a pair of negative signal sources and a pair of positive gate voltage sources comprising substantially identical first and second vacuum tube means each including at least a plate, a grid, and a cathode; substantially identical first and second resistors connected in common at one of their ends and at their other ends to the cathodes of said first and second vacuum tube means respectively; a voltage divider including series-connected third and fourth resistors, the resistance of said third resistor being very much greater than the resistance of said fourth resistor, the free end of said fourth resistor being connected in common with the commonly connected ends of said first and second resistors; an output terminal for said circuit connected to the junction of said third and fourth resistors; first and second diodes, the anode of said diodes being connected in common with the junction of said third and fourth resistors, the cathode of said first diode being connected to the cathode of said first vacuum tube means and the cathode of said second diode being connected to the cathode of said second vacuum tube means; a third vacuum tube means having a plate, a grid, and a cathode; bias means connected at one end to the cathode of said third vacuum tube means and at its other end to the cathode of said first vacuum tube means for normally blocking plate current through said third vacuum tube means, said third vacuum tube means being rendered conductive when there is a positive gate voltage input to the grid circuit thereof from one of the gate sources for raising the potential of the cathode of said first vacuum tube means above the potential of said output terminal; a fourth vacuum tube means having a plate, a grid, and a cathode; cut-off bias means connected at one end to the cathode of said fourth vacuum tube means and at its other end to the cathode of said second vacuum tube means for normally blocking plate current through said fourth vacuum tube means, said fourth vacuum tube means being rendered conductive when there is a positive gate voltage input to the grid circuit thereof from the other of the gate sources for raising the potential of the cathode of said second vacuum tube means above the potential of said output terminal; the plates of said first, second, third, and fourth vacuum tube means, and the free end of said third resistor being connected in common; whereby when a direct current power supply is connected across said voltage divider and with no signal input to said first and second vacuum tube means there is no signal output at said output terminal, and with a negative signal input to either of said first and second vacuum tube means, a corresponding output signal appears at said output terminal, and when there are negative signal inputs to said first and second vacuum tube means simultaneously an output signal corresponding only to the stronger of the signal inputs appears at said output terminal, and a negative signal input to either of said first and second vacuum tube means being prevented from producing a corresponding output signal at said output terminal if there is a positive gate voltage input to the corresponding one of said third and fourth vacuum tube means coincident with the input signal.

2. An electronic switching circuit for use with a selected number of negative signal sources and a corresponding number of positive gate voltage sources for providing an output signal corresponding to each negative input signal from said negative signal sources except when two or more negative input signals occur simultaneously in which case said circuit provides an output signal corresponding to the strongest only of the simultaneous input signals and in response to positive gate voltage inputs thereto from selected ones of said positive gate voltage sources to preclude output signals for negative input signals from the corresponding negative signal sources coincident with the positive gate voltage inputs, said circuit comprising; a corresponding number of cathode followers that are normally conductive and having a predetermined quiescent cathode potential; first and second series-connected resistors, the resistance of said first resistor being many times greater than the resistance of said second resistor, said series-connected resistors connected in shunt with said cathode followers such that said first resistor is connected to the anodes of said cathode followers, the ratio of resistances being such that the quiescent voltage at the junction of said resistors is less than the quiescent voltage of the cathodes of said cathode followers but higher than the voltage of the cathode of a cathode follower to which there is a negative signal input; a corresponding number of diodes whose anodes are connected in common with the junction of said resistors and whose cathodes are connected to the cathodes of said cathode followers respectively; a corresponding number of normally nonconductive means connected in shunt with the anode-cathode of said cathode followers respectively, each of said normally nonconductive means being conductive during a positive gate voltage input thereto from a corresponding one of said positive gate voltage sources, whereby when a normally nonconductive means is rendered conductive the cathode voltage of the corresponding cathode follower is raised sufficiently so that it is higher than the quiescent voltage of the junction of said resistors.

References Cited in the file of this patent

UNITED STATES PATENTS

| | | |
|---|---|---|
| 2,252,613 | Bingley | Aug. 12, 1941 |
| 2,485,665 | Shepherd | Oct. 25, 1949 |
| 2,538,028 | Mozley | Jan. 16, 1951 |
| 2,541,932 | Melhose | Feb. 13, 1951 |
| 2,624,770 | Yetter | June 6, 1953 |
| 2,706,265 | Buehler | Apr. 12, 1955 |